United States Patent
Heimbruch et al.

[11] Patent Number: 5,992,238
[45] Date of Patent: Nov. 30, 1999

[54] VIBRATION SPEED SENSOR

[75] Inventors: Glenn A. Heimbruch, Franklin; James Chaplin, Racine, both of Wis.

[73] Assignee: Racine Federated Inc., Racine, Wis.

[21] Appl. No.: 09/158,427

[22] Filed: Sep. 21, 1998

Related U.S. Application Data

[63] Continuation-in-part of application No. 08/801,797, Feb. 14, 1997, abandoned.

[51] Int. Cl.$^6$ .............................. G01H 11/02; E01C 19/38
[52] U.S. Cl. .............................. 73/660; 324/174; 366/123
[58] Field of Search .............................. 73/660, 662, 667; 366/123, 128; 404/117, 115; 324/174

[56] References Cited

U.S. PATENT DOCUMENTS

| | | | |
|---|---|---|---|
| 3,814,532 | 6/1974 | Barrett et al. | 404/117 |
| 4,057,222 | 11/1977 | Lyle | 366/123 |
| 5,564,824 | 10/1996 | Chaplin et al. | 366/123 |
| 5,618,133 | 4/1997 | Mitsui et al. | 404/117 |
| 5,719,338 | 2/1998 | Magalski et al. | 73/660 |

OTHER PUBLICATIONS

"Hall Effect Speed Sensing in Gerotor Hydraulic Motors" by James M. Dowling (pp. 61–69). (undated).
Display entitled "Vibrator Speed Control" displayed by Minnich Mfg. at ConExpo–Con/Agg Trade Show, Las Vegas, NV, Mar. 20–24, 1996.
Handout entitled "Check Out This Demonstration . . . of the Smart Hydraulic Paving Vibrator" provided by Wyco Tool Co. at ConExpo–Con/Agg Trade Show, Mar. 1996.
Handout entitled "Minnich Introduces . . . Auto Vib" provided by Minnich Mfg. at ConExpo–Con/Agg Trade Show Mar. 1996.
Handout entitled "Auto Vibe II—The 2nd Generation" provided by Minnich Mfg. at World of Concrete Show, Orlando, FL, Jan. 18–21, 1998.

*Primary Examiner*—John E. Chapman
*Attorney, Agent, or Firm*—Wood, Phillips, VanSanten, Clark & Mortimer

[57] ABSTRACT

In a vibrator intending to be at least partially submerged in concrete or semi-fluid or viscous material for vibration thereof, the vibrator having a housing open at one end and enclosing a rotating eccentric weight assembly, and a motor attached to the housing open end driving the rotating eccentric weight, a vibration speed sensor includes a magnetic pick-up disposed in a port in an end wall of the motor and adjacent an end of a gear/gear shaft of magnetic material in said motor, wherein the gear/gear shaft has a discontinuity adjacent the magnetic pick-up, whereby rotation of the gear/gear shaft is sensed by the magnetic pick-up. The motor includes hydraulic inlet and outlet ports in the motor end wall with the magnetic pickup port disposed adjacent thereto. An output cable is connected to the magnetic pick-up and extends in parallel with hydraulic hoses attached to the hydraulic inlet and outlet ports. The hydraulic hoses and output cable are surrounded and protected by a generally tubular shield attached to one of the a) housing and b) motor. Processing means is connected to the output cable for receiving signals generated by the magnetic pick-up and in response therefor producing a signal representative of vibration speed. Display means is provided and is responsive to the signal for providing a visual indication of vibration speed.

22 Claims, 4 Drawing Sheets

VIBRATION SPEED SENSOR

CROSS-REFERENCE TO RELATED APPLICATIONS

This is a continuation-in-part of Ser. No. 08/801,797, filed Feb. 14, 1997, abandoned.

FIELD OF THE INVENTION

The present invention relates to rotary vibrators, and more particularly to a vibration speed sensor for use in rotary vibrators intending to be submerged in concrete or other semi-fluid or viscous material for vibration thereof.

BACKGROUND OF THE INVENTION

The use of rotary immersion vibrators to compact unset material, such as concrete, is well-known in the art. Typically, such vibrators are at least partially immersed into concrete which has been poured into forms to build sidewalks, patios, roads, ramps, bridges, etc., so that the concrete can be vibrated to eliminate air pockets and avoid the formation of undesirable pockets or honeycombs which would decrease the structural strength of the concrete. Normally, a plurality of vibrators are provided, as on a concrete paving machine, with the vibrators, various controls and sensors, paving machine, etc., generally defining a vibration system.

Generally, rotary vibrators include an elongated tubular shaped housing enclosing a rotating eccentric weight which is driven by a motor, normally hydraulic, to generate vibrations. The rotating eccentric weight is normally straddle-mounted by rolling element bearings located at either end of the eccentric weight to transfer the oscillating radial loads from the eccentric weight to the tubular housing.

It is desirable to measure the vibration speed of these rotary vibrators. Optimal vibration speeds can then be determined for achieving maximum structural strength of the concrete which is being vibrated.

Further, the industry is moving toward using drier mixes of concrete to achieve higher structural strength. These drier mixes of concrete require higher vibratory forces in order to be adequately compacted. It is therefore important to monitor the vibration speed of the vibrators to ensure that these high vibratory forces, necessary for the material to be compacted, are being achieved.

Still further, by monitoring vibration speed, the life of a vibrator can be more accurately determined. This would allow a user to take precautionary measures, such as replacing a vibrator that is at or near the end of its "life span", in order to avoid shutdown of a paving machine due to vibrator failure, for example.

Due to the harsh environment in which the vibrator is normally used, it is difficult to design a device for sensing vibration speed which can withstand the normal working conditions of the vibrator. Any external sensing device would have to be capable of withstanding the high vibration speeds which are achieved by the vibrator without becoming detached or disabled. It is generally not feasible to attach a sensing device to the vibrator at an angle generally perpendicular to the axis of the tubular housing, since the sensing device would be prone to breakage. The forces from the concrete or other semi-fluid material would be acting generally transverse to the length of the attached sensing device as the vibrator is being pulled through the concrete, etc., increasing the likelihood of the sensing device breaking off from the vibrator. Also, the external forces acting on the sensing device from the concrete, etc., may affect the operation of the vibration sensing device causing false readings and/or disablement of the sensing device. Further, the sensing device could easily be broken off during transportation of the vibrator.

It is therefore an object of the invention to provide a vibration speed sensor for a rotary vibrator capable of withstanding high vibration speeds normally associated with the vibrator, and also being protected against the harsh environment in which the vibrator normally operates as by being physically incorporated in the vibrator.

BRIEF SUMMARY OF THE INVENTION

In accordance with the present invention, a rotary vibrator is provided having a housing open at one end and enclosing a rotating eccentric weight and bearing assembly, and a motor attached to the open end of the housing driving the rotating eccentric weight. A magnetic pick-up is disposed in a port formed in an end wall of the motor and adjacent a radially slotted gear shaft in the motor. The magnetic pick-up port has an axis generally parallel with the axis of the motor gear shaft.

In accordance with a feature of the vibrator, the motor comprises a hydraulic motor having inlet and outlet ports in the end wall, and the magnetic pick-up port is disposed adjacent and parallel to the hydraulic inlet and outlet ports.

In accordance with another feature of the vibrator, an output cable is attached to the magnetic pick-up and extends in parallel with hydraulic hoses attached to the input and output ports. The hydraulic hoses and the output cable are surrounded by a shield which is attached to one of the a) housing and b) motor.

A further feature of the invention is that processing means connected with the magnetic pick-up develop a first signal representative of vibration speed. Display means responsive to the first signal provide a visual indication of vibration speed.

In still another form of the invention, a pressure sensor is attached to the hydraulic input hose and provides a signal to the processing means. Processing means generate a second signal representative of hydraulic pressure. Display means responsive to the second signal provide a visual indication of hydraulic fluid pressure. The display means also supplies the vibration speed and hydraulic fluid pressure data to a recording device.

In accordance with an alternative embodiment of the present invention, a rotary vibrator is provided having a housing open at one end and enclosing a rotating eccentric weight and bearing assembly, and a motor attached to the open end of the housing driving the rotating eccentric weight. A magnetic pick-up is disposed in a port formed in an end wall of the motor and adjacent a gear of magnetic material in the motor, the gear having a discontinuity in the end adjacent the magnetic pick-up. The magnetic pick-up port has an axis generally parallel with the axis of the motor gear.

In accordance with a further feature of the vibrator, the discontinuity in the end of the motor gear adjacent the magnetic pick-up includes a plurality of gear teeth. The magnetic pick-up is disposed adjacent the plurality of gear teeth to sense gear rotation.

Other objectives, features and advantages of the present invention will be apparent from the following detailed description taken in conjunction with the accompanying drawings.

BRIEF DESCRIPTION OF THE DRAWINGS

The features of the present invention which are believed to be novel are set forth with particularity in the appended claims. The present invention, together with its objectives and advantages thereof, may best be understood by reference to the following description taken in conjunction with the accompanying drawings, in which like reference numerals identify like elements and in which:

DETAILED DESCRIPTION OF THE INVENTION

Figure 1:
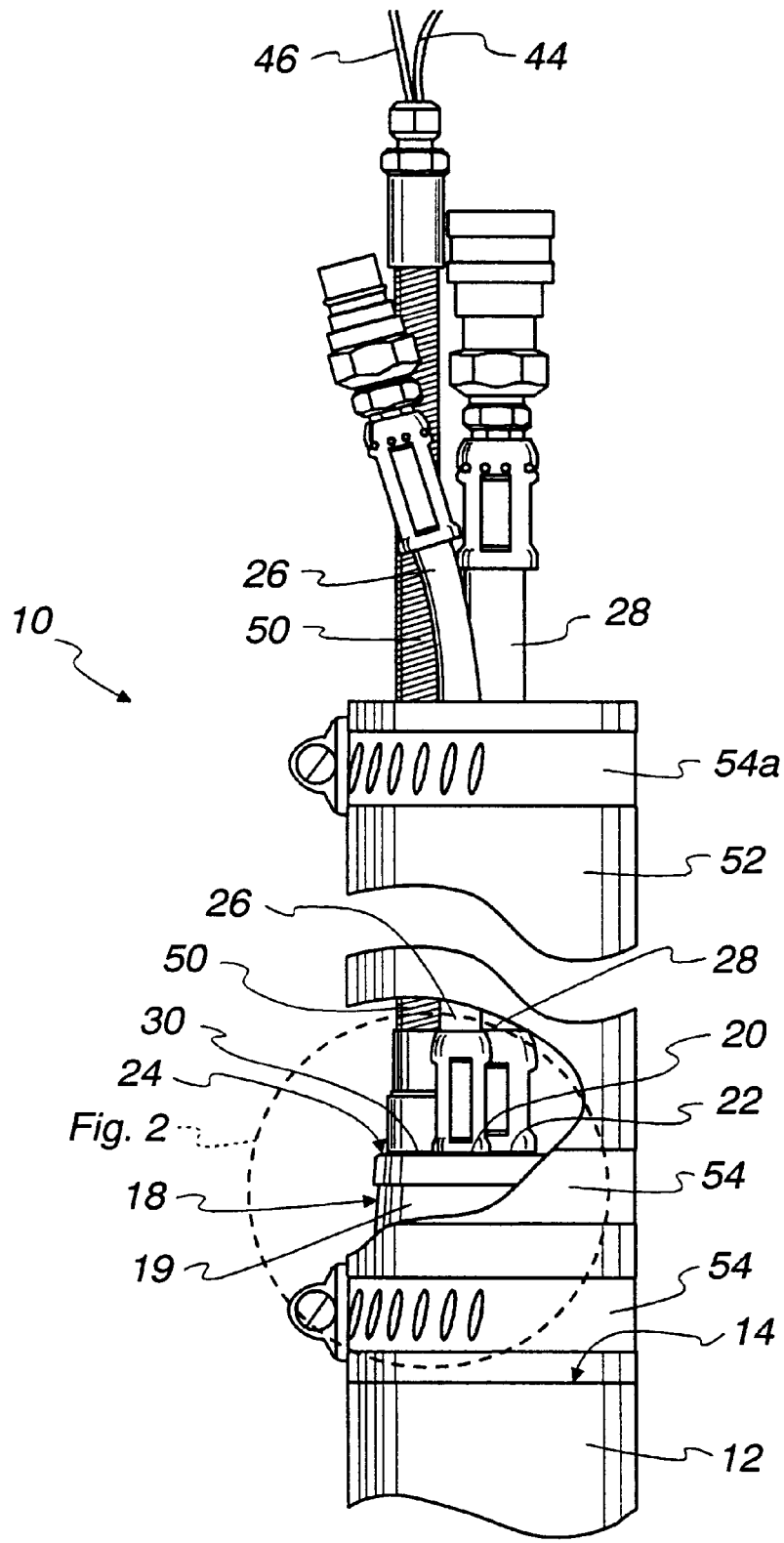
FIG. 1 is a side view of an end portion of a rotary vibrator embodying the invention, with a portion of a protective shield cut away, depicting attachment of hydraulic input/output hoses and a magnetic pick-up cable to an end wall of the hydraulic motor.

A rotating vibrator, generally indicated at 10 in FIG. 1, has an exterior generally defined by an elongated tubular housing 12, only a portion of which is shown. A rotating eccentric weight and bearing assembly (not shown) are disposed inside housing 12. U.S. Pat. No. 5,564,824 to Chaplin et al, incorporated herein by reference, discloses a preferred eccentric weight and bearing assembly disposed inside a housing that may be implemented with the present invention. The housing 12 may be a metal tube having an open end 14 and a closed end (not shown). Similar to the housing disclosed in Chaplin et al U.S. Pat. No. 5,564,824, the closed end may be integrally formed with housing 12, or may comprise a cap detachably connected to the housing 12.

A hydraulic motor 18 is attached to the open end 14 of housing 12, with a portion of the motor 18 extending into and being surrounded by housing 12. The motor 18 is connected to and drives the rotating eccentric weight. An O-ring (not shown) is provided about motor 18 to completely seal motor 18 against housing 12 and prevent concrete or other semi-fluid or viscous material, into which vibrator 10 is at least partially submerged, from entering housing 12.

In a preferred form, motor 18 has a cylindrical casing 19 with hydraulic input and output ports 20, 22 formed in end wall 24 of motor 18 opposite the end attached to housing 12. The hydraulic input and output ports 20, 22 are attached to input and output hydraulic fluid hoses 26, 28, respectively.

Figure 2:
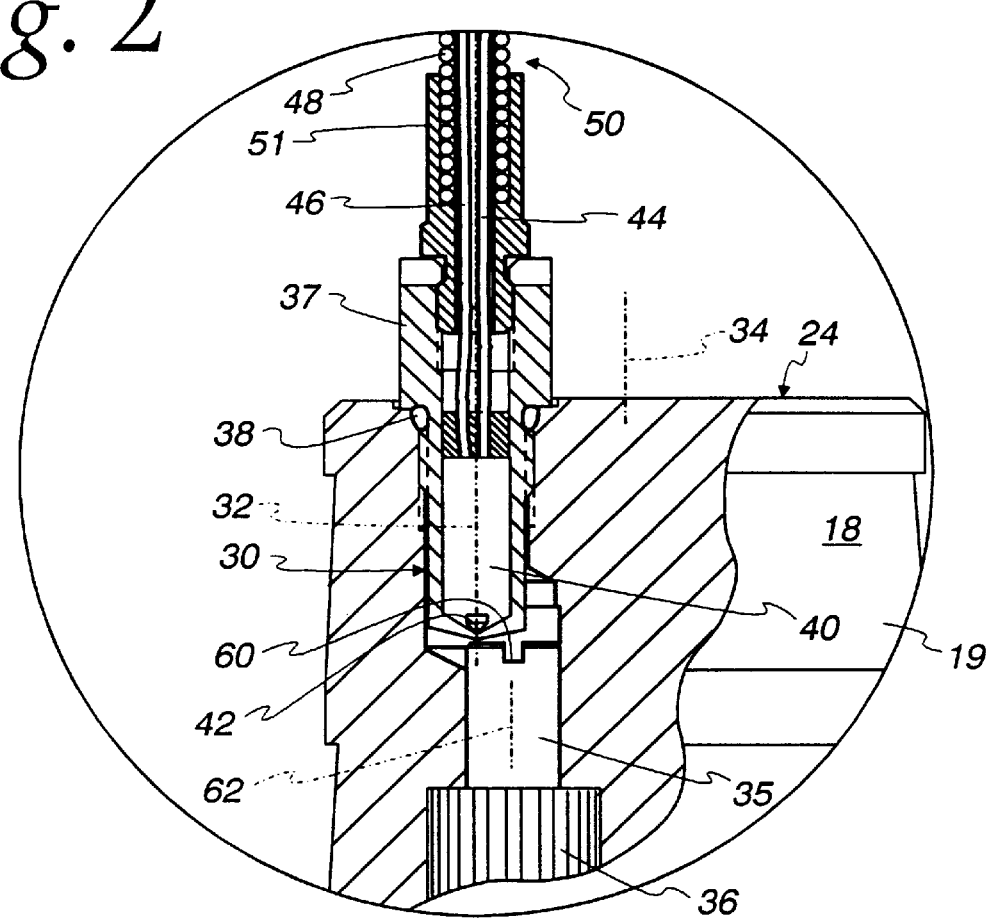
FIG. 2 is an enlarged view of the portion of FIG. 1 indicated by the broken line labelled FIG. 2 with a portion in section and the protective shield and hydraulic input/output hoses removed.
Figure 3:
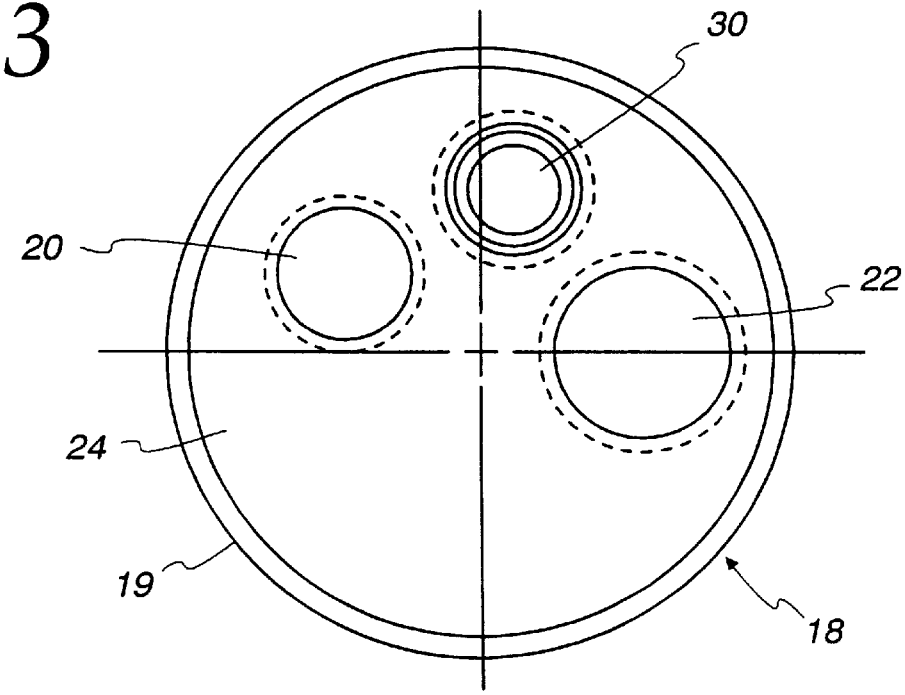
FIG. 3 is an end view of the motor illustrating the placement of the hydraulic input/output and magnetic pick-up ports.

As seen in FIG. 2, an axial bore 30, defining a magnetic pick-up port, is provided in end wall 24 of motor 18. Bore 30 has an axis 32 generally parallel with an axis 34 of housing 12 and motor 18 (in a preferred form, motor 18 and housing 12 have concentric axes), and is disposed between and offset from the hydraulic input and output ports 20, 22, as can be best seen in FIG. 3, and adjacent the end of an internal gear shaft 35 extending from internal gear 36 as described below.

A shell 37 is threaded in bore 30. O-ring 38 is provided to seal the motor 18 against leaking and also prevent extraneous hydraulic fluid and/or concrete or other semi-fluid or viscous material from entering the motor 18.

A magnetic pick-up 40 is disposed inside shell 37. Magnetic pick-up 40 may be secured in shell 37 by epoxy or other similar material, and generally includes a coil (not shown) wrapped around a permanent magnet (the tip 42 of the permanent magnet being visible in FIG. 2). Electrical leads 44, 46 extend from the coil of magnetic pick-up 40 and are protected by the spiral casing 48 of a Bowden cable 50. Bowden cable 50 is attached to shell 37 via a fitting 51 crimped on to the Bowden cable 50. The crimped fitting 51 is threaded in shell 37, with the Bowden cable 50 extending generally parallel with hydraulic input and output hoses 26, 28.

A protective sheath 52 (see FIG. 1) is attached to motor 18 and surrounds Bowden cable 50 and hydraulic input and output hoses 26, 28. Preferably the protective sheath 52 is secured at one end to the exposed portion of motor 18 by clamps 54, and is secured to a rubber stopper (not shown), through which Bowden cable 50 and hydraulic input/output hoses 26, 28 extend, at the other end by clamp 54a, and protects the hydraulic hoses 26, 28 and Bowden cable 50 from the harsh environment in which the vibrator 10 is used.

If a motor housing (not shown) is utilized, the motor housing being attached to the open end 14 of the housing 12 and containing the motor 18, the protective sheath 52 would preferably be attached to the motor housing via clamps 54.

Referring to FIG. 2, bore 30 extends into motor 18 such that the magnetic pick-up 40, when positioned in shell 37 secured in bore 30, is adjacent an end of the internal gear shaft 35 in motor 18. Gear shaft 35 is provided with a radial slot 60 on the end adjacent magnetic pick-up 40. The magnetic pick-up 40 is positioned such that the tip 42 of the permanent magnet is axially adjacent the radially slotted end of gear shaft 35 and radially spaced from the axis 62 of the gear shaft 35. In a preferred form, the axis 62 of gear shaft 35 is generally parallel with axes 32 and 34 of bore 30 and housing 12/motor 18, respectively.

In operation, the gear shaft 35 rotates at a rate which corresponds to the vibration speed of vibrator 10. Rotation of gear shaft 35 is sensed by the adjacent magnetic pick-up 40, and corresponding signals are generated and transmitted from the coil to electrical leads 44, 46.

Figure 4:
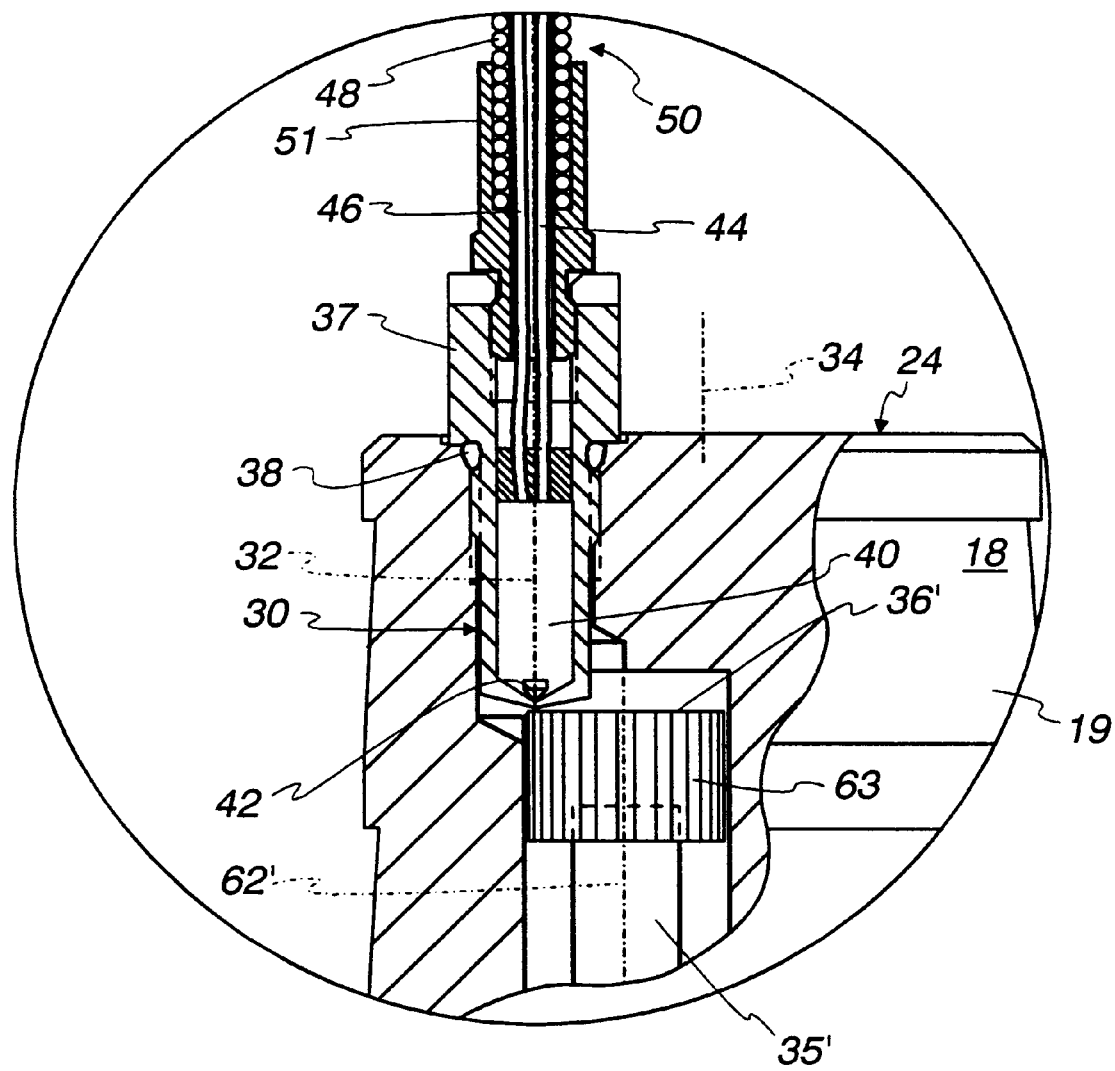
FIG. 4 is an alternative embodiment of the magnetic pick-up and gear assembly shown in FIG. 2.

In an alternative embodiment, as shown in FIG. 4, the magnetic pick-up 40 may be positioned such that the tip 42 of the permanent magnet is adjacent an end of a gear 36' internal to the motor 18. The gear 36' is keyed, fastened, or otherwise operably connected to gear shaft 35' for rotation therewith or thereon, and includes a plurality of gear teeth 63, with the magnetic pick-up 40 radially spaced from the axis 62' of the gear 36'.

More specifically, the magnetic pick-up 40 is positioned adjacent the outer circumferential edge of the gear 36', the outer circumferential edge of the gear 36' including the gear teeth 63. In a preferred form, the axis 62' of the gear 36' is generally parallel with axes 32 and 34 of bore 30 and housing 12/motor 18, respectively.

In operation, the gear 36' rotates at a rate which corresponds to the vibration speed of vibrator 10. Rotation of the gear 36' is sensed by the adjacent magnetic pick-up 40, and corresponding signals are generated and transmitted from the coil to electrical leads 44, 46.

Figure 5:
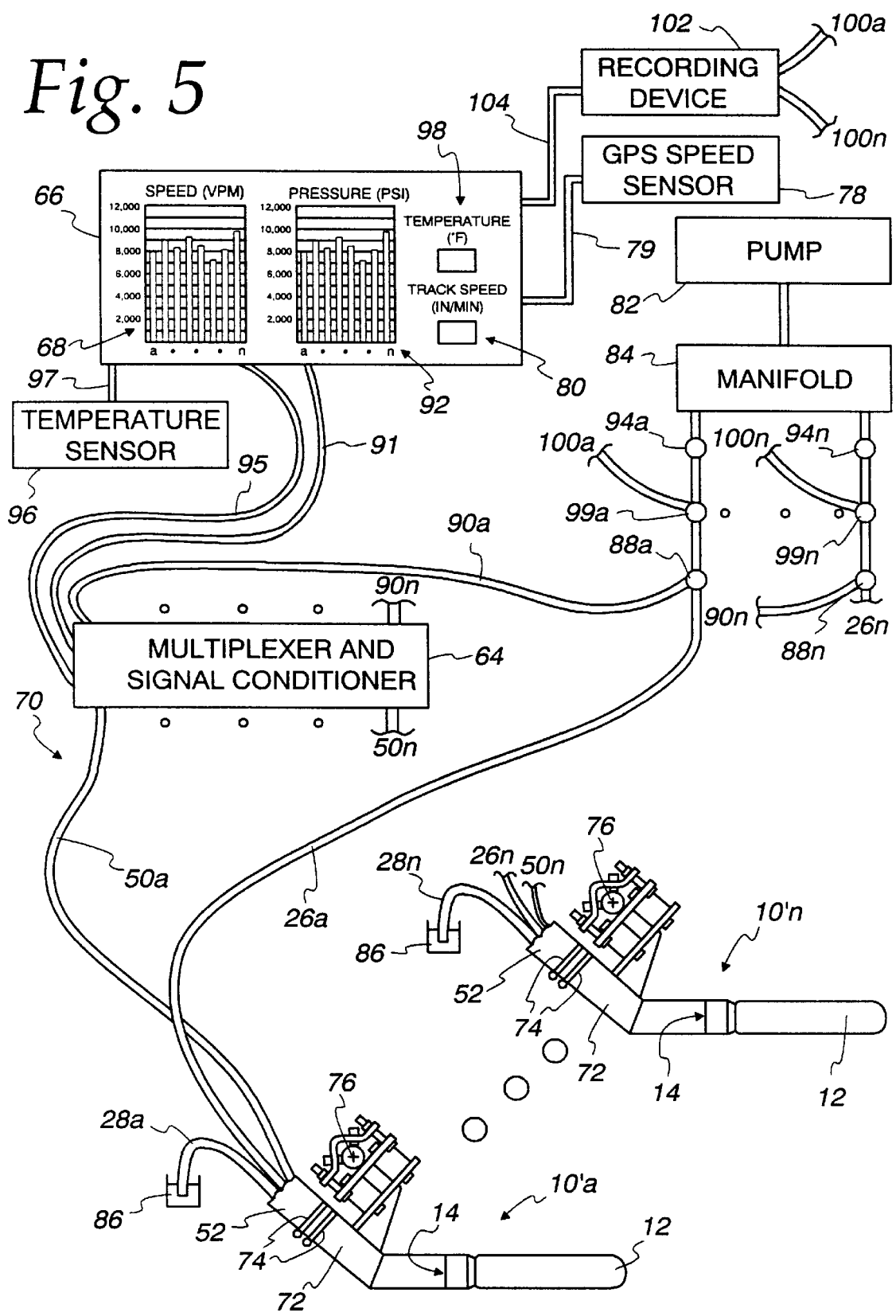
FIG. 5 is a schematic diagram of a vibration sensing and control system for a plurality of vibrators, as incorporated in a concrete paving machine.

As shown in FIG. 5, the signals from the magnetic pick-up 40 are coupled to a processing means, including a multiplexer and signal conditioner circuit 64, which determines the vibration speed of vibrator 10 and outputs the result to a display 66 for providing a visual indication 68 of vibration speed.

A vibration sensing and control system 70 for multiple vibrators, as on a concrete paving machine, is depicted in FIG. 5. Such machines typically move along a roadway being paved spreading and finishing the concrete. The particular system 70 depicted in FIG. 5 includes a plurality of angle head vibrators 10'a–n (where n is any positive integer). Angle head vibrator 10' includes all the elements described with respect to vibrator 10, shown in FIG. 1, further including an angle bracket 72 disposed between housing 12 and protective sheath 52. The open end 14 of housing 12 may be threaded into an end of angle bracket 72, while the protective sheath 52 is secured to the other end of angle bracket 72 by clamps 74. In this configuration, hydraulic input and output hoses 26a–n, 28a–n and Bowden cables 50a–n extend through and are protected by angle brackets 72 and protective sheaths 52.

The system 70 includes a plurality of rotary vibrators 10'a–n attached to a mounting tube 76 or other structural element of the concrete paving machine. The vibrators 10'a–n are at least partially immersed in the concrete to be vibrated, and are "pulled" through the material by movement of the paving machine. The speed at which the vibrators 10'a–n are pulled through the concrete is sensed by a GPS speed sensor 78 and provided along line 79 to display 66 and displayed at 80 in inches/minute.

Hydraulic fluid is provided to each of the motors 18 of rotary vibrators 10'a–n via hydraulic pump 82, manifold 84, and input hydraulic pressure hoses 26a–n. The return (output) hydraulic hoses 28a–n empty into a reservoir or return sump 86. Pressure sensors 88a–n are coupled to hydraulic input hoses 28a–n and monitor the pressure level of the hydraulic fluid input to the motors 18 of vibrators 10'a–n. Pressure sensors 88a–n coupled to hydraulic input lines 26a–n provide multiplexer and signal conditioner 64 with a signal indicative of the pressure in the respective hydraulic input hoses 26a–n via lines 90a–n. Multiplexer and signal conditioner 64 outputs the result to display 66, via line 91, which provides a visual indication 92 of hydraulic fluid pressure for each vibrator 10'a–n in the system 70. Monitoring the hydraulic pressure of hydraulic input lines 26a–n allows pressure compensating flow control valves 94a–n, coupled in hydraulic input lines 26a–n, to modify the flow of hydraulic fluid, either automatically or manually, to maintain optimum pressure levels for each vibrator 10'a–n.

The vibration speed of each motor 18 is sensed by the combination of the magnetic pick-up 40 and slotted gear shaft 35 as previously described with respect to FIG. 2, or by the combination of the magnetic pickup 40 and gear 36' as previously described with respect to FIG. 4. The signal sensed by the magnetic pick-up 40 is provided along electrical leads 44, 46 which are disposed in Bowden cables 50a–n. The signals are provided to the multiplexer and signal conditioner circuit 64, which determines the vibration speed of each individual vibrator 10'a–n and supplies the results, via line 95, to display 66 which displays at 68 the vibration speed for each vibrator 10'a–n in the system 70.

A temperature sensor 96 is also provided in the system 70 for sensing the temperature of the hydraulic fluid and providing the results along line 97 to display 66 which displays the temperature in °F. at 98.

Each of the hydraulic input lines 26a–n also includes a flow meter 99a–n which provides a signal, via lines 100a–n, indicative of the hydraulic fluid flow rate in the respective hydraulic input hose 26a–n to a recording device 102. However, if so desired, the hydraulic fluid flow rate signals on lines 100a–n may alternatively be supplied to multiplexer and signal conditioner 64, or other similar signal conditioning circuits, and the hydraulic fluid flow rate for each vibrator 10'a–n displayed on display 66.

All of the information displayed on display 66, including but not limited to vibration speed, hydraulic fluid pressure, hydraulic fluid temperature and track speed, may also be supplied to the recording device 102 via line 104. The information recorded in recording device 102 can be used in a system where the contractor records the precise mix of concrete used and how it was vibrated, along with any other pertinent data, to help in determining optimum vibrational speeds, track speeds, etc. for various conditions. The information could also be processed with an algorithm or look up table to enable an operator to predict the impending failure of a vibrator. This would provide the operator with the opportunity to change or repair the vibrator prior to failure, and could virtually eliminate paving down time due to vibrator failure.

It should be understood that the present invention may be embodied in other specific forms without departing from the spirit or the scope thereof. The present examples, therefore, are to be considered in all respects as illustrative and not restrictive, and the present invention is not to be limited to the details given herein.

We claim:

1. In a vibrator to be at least partially submerged in concrete or other semi-fluid or viscous material for vibration thereof, the vibrator having a housing open at one end and enclosing a rotating eccentric weight assembly, and a motor attached to the housing open end driving said rotating eccentric weight, a vibration speed sensor comprising:

a magnetic pick-up disposed in a port in said motor and adjacent an end of a gear shaft of magnetic material in said motor, said port having an axis generally parallel with an axis of said motor gear shaft, said magnetic pick-up being radially spaced from said axis of said motor gear shaft, wherein said motor gear shaft has a discontinuity in the end adjacent said magnetic pick-up, whereby rotation of said motor gear shaft is sensed by the magnetic pick-up.

2. The speed sensor of claim 1, wherein said motor comprises a hydraulic motor having a casing with an end wall, and hydraulic inlet and outlet ports in the end wall, wherein said magnetic pick-up port is disposed in the end wall adjacent said hydraulic inlet and outlet ports.

3. The speed sensor of claim 2, further including a shield attached to one of the a) housing and b) motor casing and surrounding hydraulic hoses attached to said hydraulic inlet and outlet ports, wherein an output cable attached to said magnetic pick-up extends in parallel with said hydraulic hoses with said output cable also being surrounded by said shield.

4. The speed sensor of claim 1, wherein the discontinuity in the end of the motor gear shaft adjacent said magnetic pick-up includes a radial slot.

5. In a vibrator to be at least partially submerged in concrete or other semi-fluid or viscous material for vibration thereof, the vibrator having an elongated tubular housing open at one end and enclosing a rotating eccentric weight assembly, and a motor attached to the housing open end driving said rotating eccentric weight, the motor having a casing generally conforming to the tubular shape of the housing and an end wall, a vibration speed sensor comprising:

a magnetic pick-up disposed in a port in the end wall of said motor; and a gear shaft of magnetic material internal to said motor having an end with a discontinuity adjacent said magnetic pick-up, said magnetic pick-up sensing rotation of said gear shaft.

6. The speed sensor of claim 5, wherein said housing, said magnetic pick-up port and said gear shaft have generally parallel axes.

7. The speed sensor of claim 5, wherein the discontinuity in the end of the gear shaft adjacent said magnetic pick-up includes a radial slot.

8. The speed sensor of claim 7, wherein said magnetic pick-up includes a pole piece disposed radially from the axis of said gear shaft and adjacent said radially slotted end.

9. The speed sensor of claim 5, wherein said motor comprises a hydraulic motor having hydraulic inlet and outlet ports in the end wall of the motor, wherein said magnetic pick-up port is provided in the motor end wall adjacent said hydraulic inlet and outlet ports.

10. The speed sensor of claim 9, further including a shield attached to one of the a) housing and b) motor and surrounding hydraulic hoses attached to said hydraulic inlet and outlet ports, and an output cable attached to said magnetic pick-up, said output cable extending in parallel with said hydraulic hoses with said output cable also being surrounded by said shield.

11. In a vibrator intended to be at least partially submerged in concrete or other semi-fluid or viscous material for vibration thereof, the vibrator having an elongated tubular housing open at one end and enclosing a rotating eccentric weight assembly, a hydraulic motor attached to the housing open end driving said rotating eccentric weight, the motor having hydraulic input and output ports attached to input and output hydraulic hoses, respectively, extending therefrom, said input hydraulic hose receiving hydraulic fluid under pressure from a hydraulic pump and said output hydraulic hose discharging the hydraulic fluid to a return sump, and a generally tubular shield attached to one of the a) housing and b) motor and surrounding the hydraulic motor and hoses, a vibration speed sensor comprising:

a magnetic pick-up disposed in a port in said hydraulic motor, said magnetic pick-up port displaced adjacent said hydraulic input and output ports;

an output cable connected to said magnetic pick-up and extending in parallel with said hydraulic hoses and with said output cable also being surrounded by said shield; and a gear shaft internal to said hydraulic motor having a radial slot in an end thereof, said magnetic pick-up being disposed adjacent said radially slotted end of said gear shaft to sense shaft rotation.

12. In a vibrator to be at least partially submerged in concrete or other semi-fluid or viscous material for vibration thereof, the vibrator having a housing open at one end and enclosing a rotating eccentric weight assembly, and a motor attached to the housing open end driving said rotating eccentric weight, a vibration speed sensor comprising:

a magnetic pick-up disposed in a port in said motor and adjacent a gear of magnetic material in said motor, said port having an axis generally parallel with an axis of said motor gear, said magnetic pick-up being radially spaced from said axis of said motor gear, wherein said motor gear has a discontinuity adjacent said magnetic pick-up, whereby rotation of said motor gear is sensed by the magnetic pick-up.

13. The speed sensor of claim 12, wherein said motor comprises a hydraulic motor having a casing with an end wall, and hydraulic inlet and outlet ports in the end wall, wherein said magnetic pick-up port is disposed in the end wall adjacent said hydraulic inlet and outlet ports.

14. The speed sensor of claim 13, further including a shield attached to one of the a) housing and b) motor casing and surrounding hydraulic hoses attached to said hydraulic inlet and outlet ports, wherein an output cable attached to said magnetic pick-up extends in parallel with said hydraulic hoses with said output cable also being surrounded by said shield.

15. The speed sensor of claim 12, wherein the discontinuity in the motor gear adjacent said magnetic pick-up includes a plurality of gear teeth.

16. In a vibrator to be at least partially submerged in concrete or other semi-fluid or viscous material for vibration thereof, the vibrator having an elongated tubular housing open at one end and enclosing a rotating eccentric weight assembly, and a motor attached to the housing open end driving said rotating eccentric weight, the motor having a casing generally conforming to the tubular shape of the housing and an end wall, a vibration speed sensor comprising:

a magnetic pick-up disposed in a port in the end wall of said motor; and a gear of magnetic material internal to said motor having a discontinuity adjacent said magnetic pick-up, said magnetic pick-up sensing rotation of said gear.

17. The speed sensor of claim 16, wherein said housing, said magnetic pick-up port and said gear have generally parallel axes.

18. The speed sensor of claim 16, wherein the discontinuity in the gear adjacent said magnetic pick-up includes a plurality of gear teeth.

19. The speed sensor of claim 18, wherein said magnetic pickup includes a pole piece disposed radially from the axis of said gear and adjacent said plurality of gear teeth.

20. The speed sensor of claim 16, wherein said motor comprises a hydraulic motor having hydraulic inlet and outlet ports in the end wall of the motor, wherein said magnetic pick-up port is provided in the motor end wall adjacent said hydraulic inlet and outlet ports.

21. The speed sensor of claim 20, further including a shield attached to one of the a) housing and b) motor and surrounding hydraulic hoses attached to said hydraulic inlet and outlet ports, and an output cable attached to said magnetic pick-up, said output cable extending in parallel with said hydraulic hoses with said output cable also being surrounded by said shield.

22. In a vibrator intended to be at least partially submerged in concrete or other semi-fluid or viscous material for vibration thereof, the vibrator having an elongated tubular housing open at one end and enclosing a rotating eccentric weight assembly, a hydraulic motor attached to the housing open end driving said rotating eccentric weight, the motor having hydraulic input and output ports attached to input and output hydraulic hoses, respectively, extending therefrom, said input hydraulic hose receiving hydraulic fluid under pressure from a hydraulic pump and said output hydraulic hose discharging the hydraulic fluid to a return sump, and a generally tubular shield attached to one of the a) housing and b) motor and surrounding the hydraulic motor and hoses, a vibration speed sensor comprising:

a magnetic pick-up disposed in a port in said hydraulic motor, said magnetic pick-up port displaced adjacent said hydraulic input and output ports;

an output cable connected to said magnetic pick-up and extending in parallel with said hydraulic hoses and with said output cable also being surrounded by said shield; and a gear internal to said hydraulic motor having a plurality of gear teeth, said magnetic pick-up being disposed adjacent said plurality of gear teeth to sense gear rotation.

* * * * *